US012777405B2

(12) United States Patent
Sampathkumar et al.

(10) Patent No.: US 12,777,405 B2
(45) Date of Patent: Oct. 27, 2026

(54) SYSTEMS AND METHODS FOR CLOUD-BASED SPECTRUM SURVEY AND NETWORK MANAGEMENT BASED THEREFROM

(71) Applicant: PLUME DESIGN, INC., Palo Alto, CA (US)

(72) Inventors: Badri Srinivasan Sampathkumar, Fremont, CA (US); Abhishek Mallayya Svami, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 396 days.

(21) Appl. No.: 18/595,561

(22) Filed: Mar. 5, 2024

(65) Prior Publication Data

US 2025/0287288 A1 Sep. 11, 2025

(51) Int. Cl.
*H04W 40/24* (2009.01)
*H04W 84/12* (2009.01)

(52) U.S. Cl.
CPC ....... *H04W 40/246* (2013.01); *H04W 40/248* (2013.01); *H04W 84/12* (2013.01)

(58) Field of Classification Search
CPC .................................................... H04W 40/246
See application file for complete search history.

(56) References Cited

U.S. PATENT DOCUMENTS

| | | | | |
|---|---|---|---|---|
| 12,192,820 | B2 * | 1/2025 | Yeh | G06N 3/045 |
| 2011/0243021 | A1 * | 10/2011 | Ponnuswamy | H04W 72/0446 370/252 |
| 2017/0272977 | A1 * | 9/2017 | Rengarajan | H04L 41/12 |
| 2017/0359732 | A1 * | 12/2017 | Ganu | H04W 48/02 |
| 2019/0357080 | A1 * | 11/2019 | Shanbhag | H04W 12/088 |
| 2022/0014963 | A1 * | 1/2022 | Yeh | H04W 28/0268 |
| 2022/0400392 | A1 * | 12/2022 | Ergen | H04W 24/08 |
| 2023/0209546 | A1 * | 6/2023 | Gauvreau | H04W 60/00 370/328 |

* cited by examiner

*Primary Examiner* — Abdeltif Ajid
(74) *Attorney, Agent, or Firm* — Nicholas Martin; Greenberg Traurig, LLP

(57) ABSTRACT

Disclosed are systems and methods that provide a computerized network management framework that provides novel network optimization for WiFi networks. The framework provides operations for an Access Point (AP) to perform off-channel surveys using multiple radios to collect interference and other information without causing performance degradations. The framework can configure such APs with capabilities to operate on a DFS channel simultaneously. The framework can be implemented on a Mesh network where there are multiple APs, each with multiple radios in each frequency band. Accordingly, the framework can enable computational evaluations the client devices connected on each radio on each AP and intelligently schedule the radios to be used opportunistically for off channel surveys. This enables network management for which a WiFi network at a location can be configured and/or managed to ensure optimized network connectivity and throughput.

20 Claims, 8 Drawing Sheets

SYSTEMS AND METHODS FOR CLOUD-BASED SPECTRUM SURVEY AND NETWORK MANAGEMENT BASED THEREFROM

FIELD OF THE DISCLOSURE

The present disclosure is generally related to network management, and more particularly, to a decision intelligence (DI)-based computerized framework for performing cloud-based spectrum surveys, and network management based therefrom.

SUMMARY OF THE DISCLOSURE

Disclosed are computerized systems and methods for a network management framework that provides novel network optimization for Wireless Fidelity (WiFi or Wi-Fi) networks. As discussed herein, Wi-Fi Access Points (APs) (also referred to as AP devices, used interchangeably) can perform off-channel surveys where the AP tunes its radio(s) to a different channel for a finite amount of time. This is typically done to detect WiFi clients and other APs, which may act as sources of interference. The utilization of the channel (e.g., air medium) can be used to gauge the level of interference in the spectrum that is in turn utilized to configure the network in channels that are least congested.

While an off-channel survey can aid the AP in detecting other networks and measure interference on the off-channel, its conventional mechanisms have certain technical limitations. That is, for example, when the AP is performing an off-channel survey, the client devices connected to the AP will not be able to send traffic to the network. This can be disruptive to certain data streaming and real-time applications, which rely on a persistent connection. Moreover, under certain circumstances, such as, for example, operating on a dynamic frequency selection (DFS) channel, the AP cannot move away from it. Current WiFi regulations require an AP to perform "Continuous In-Service Monitoring" when operating on a DFS channel to detect for radar events and switch to an non-DFS channel. Thus, via existing mechanisms, the AP can potentially miss a radar event if it performs an off-channel survey while operating on a DFS channel.

To overcome the above limitations of not causing performance degradations and retain the ability to use DFS channels while performing an off-channel survey, among other technical benefits, the disclosed systems and methods provide a novel framework for an AP to perform off-channel surveys using multiple radios. As provided below in more detail, the disclosed framework provides an AP with multiple radios with functionality to perform off-channels surveys (e.g., periodically, for example) to collect interference and other information without causing performance degradations. Moreover, the disclosed framework can configure such APs with capabilities to operate on a DFS channel simultaneously.

According to some embodiments, the disclosed systems and methods can be implemented on a Mesh network where there are multiple APs, each with multiple radios in each frequency band. According to some embodiments, the Cloud (e.g., cloud 106, as discussed below at least respective to FIG. 1A—for example, a provider server, device and/or controller located within and/or in association with a Cloud platform hosted on a network) can computationally evaluate the client devices connected on each radio on each AP and intelligently schedule the radios to be used opportunistically for off channel surveys. As provided below, this provides the Cloud with data about the spectrum usage at various locations within the home/small business, which can then be leveraged to choose the least congested channels for operation. Thus, the disclosed cloud-spectrum survey operations can effectuate novel network management for which a WiFi network at a location can be configured and/or managed to ensure optimized network connectivity and throughput.

According to some embodiments, cloud based spectrum surveys, as discussed herein, can be enhanced with energy aware adapt features, for example, which can allow APs to shut off their radios to preserve energy and be energy efficient. As evident from the discussion below, once the down times for an AP are determined, such "sleeping" radios can be periodically woken up, for which off-channel surveys (e.g., due to the power down operation as they are freed up) can be performed, upon which they can be put back to sleep after completion.

Moreover, in some embodiments, the disclosed cloud based spectrum survey operations can also be used to perform pre-CACs (e.g., channel availability checks) for regulatory domains that allow pre-CAC (e.g., European Telecommunications Standards Institute (ETSI), and the like) and just-in-time CAC for other regulatory domains. As evident from the disclosed systems and methods discussed below, the disclosed framework can steer client devices away from an AP and/or AP radio, and then perform the CAC on a new channel and then steer the clients again back once the CAC is completed and cleared.

According to some embodiments, a method is disclosed for performing cloud-based spectrum surveys, and network management based therefrom. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for cloud-based spectrum surveys, and network management based therefrom.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1A:
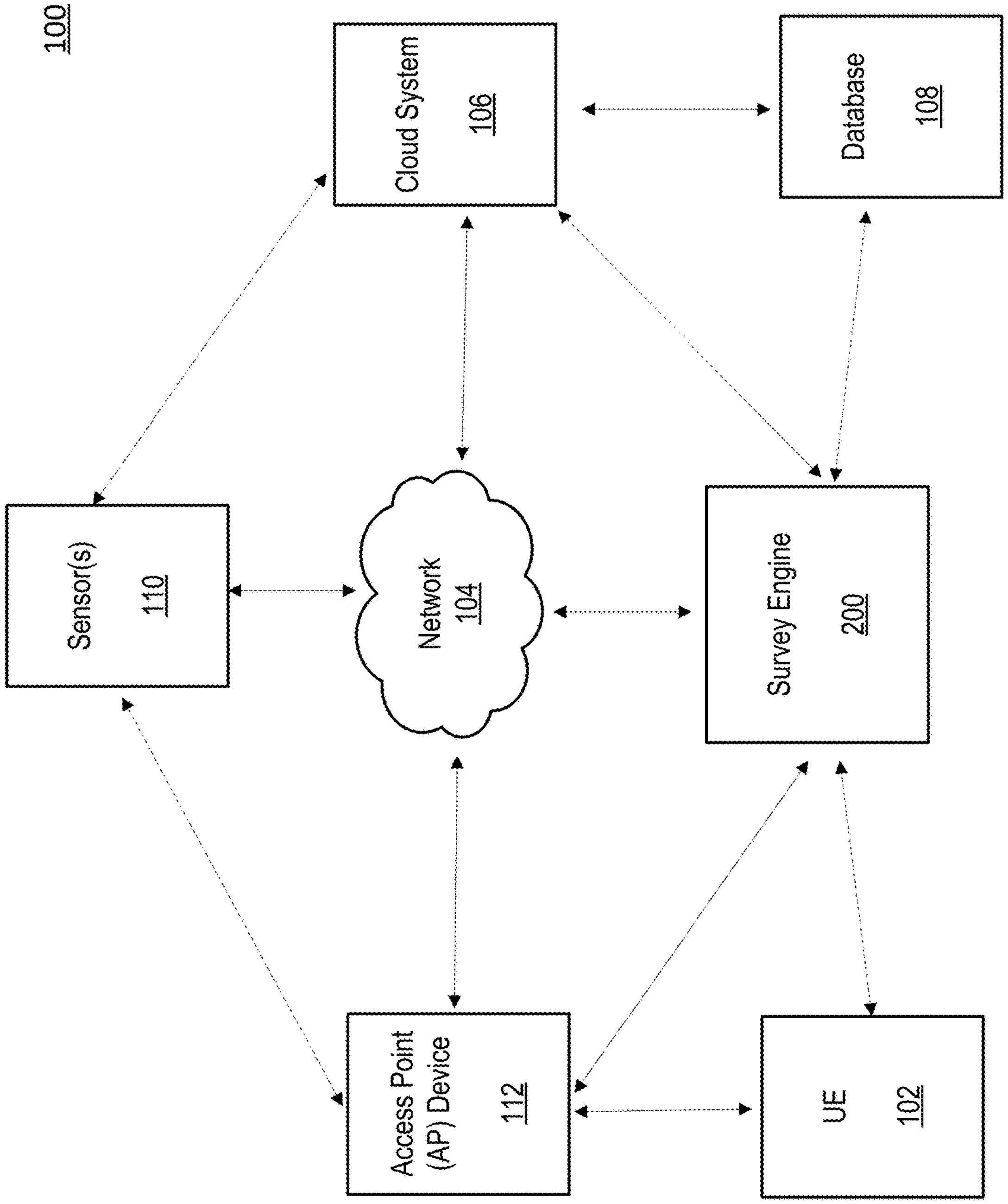
FIG. 1A is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/a/g/n/ac/ax/be, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1A, system 100 is depicted which includes user equipment (UE) 102 (e.g., a client device, as mentioned above and discussed below in relation to FIG. 6), AP device 112, network 104, cloud system 106, database 108, sensors 110 and survey engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1A.

According to some embodiments, UE 102 can be any type of device, such as, but not limited to, a mobile phone, tablet, laptop, sensor, Internet of Things (IoT) device, wearable device, autonomous machine, smart television, media streaming device, game console, and any other device equipped with a cellular or wireless or wired transceiver.

In some embodiments, peripheral devices (not shown) can be connected to UE 102, and can be any type of peripheral device, such as, but not limited to, a wearable device (e.g., smart ring, smart watch, for example), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

According to some embodiments, sensors 110 can correspond to any type of device, component and/or sensor associated with a location of system 100 (referred to, collectively, as "sensors"). In some embodiments, the sensors 110 can be any type of device that is capable of sensing and capturing data/metadata related to activity of the location. For example, the sensors 110 can include, but not be limited to, cameras, motion detectors, door and window contacts, heat and smoke detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. For example, the sensors 110 can include the sensors on UE 102 (e.g., smart phone) and/or peripheral device (e.g., a paired smart ring). In some embodiments, sensors 110 can be associated with any device connected and/or operating on cloud system 106 (e.g., a cloud-based device, such as a server that collects information related to the location, for example).

In some embodiments, network 104 can be any type of network, such as, but not limited to, a wireless network, cellular network, the Internet, and the like (as discussed above). Network 104 facilitates connectivity of the components of system 100, as illustrated in FIG. 1A.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider (e.g., Plume Design®, for example), which has associated network resources hosted on the internet or private network (e.g., network 104), which enables (via engine 200) the network management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, sensors 110, and the services and applications provided by cloud system 106 and/or survey engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
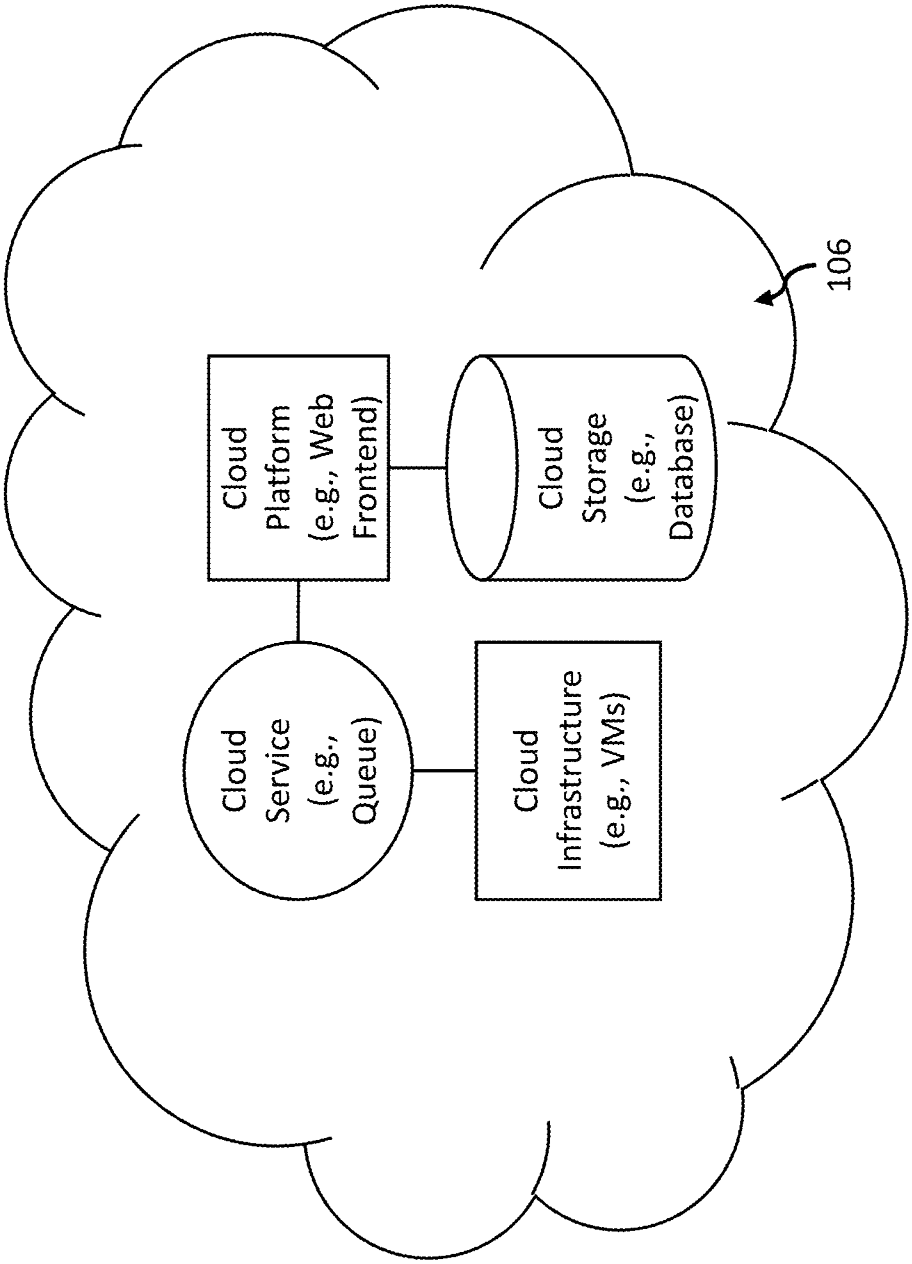
FIG. 4 depicts an exemplary implementation of an architecture according to some embodiments of the present disclosure.
Figure 5:
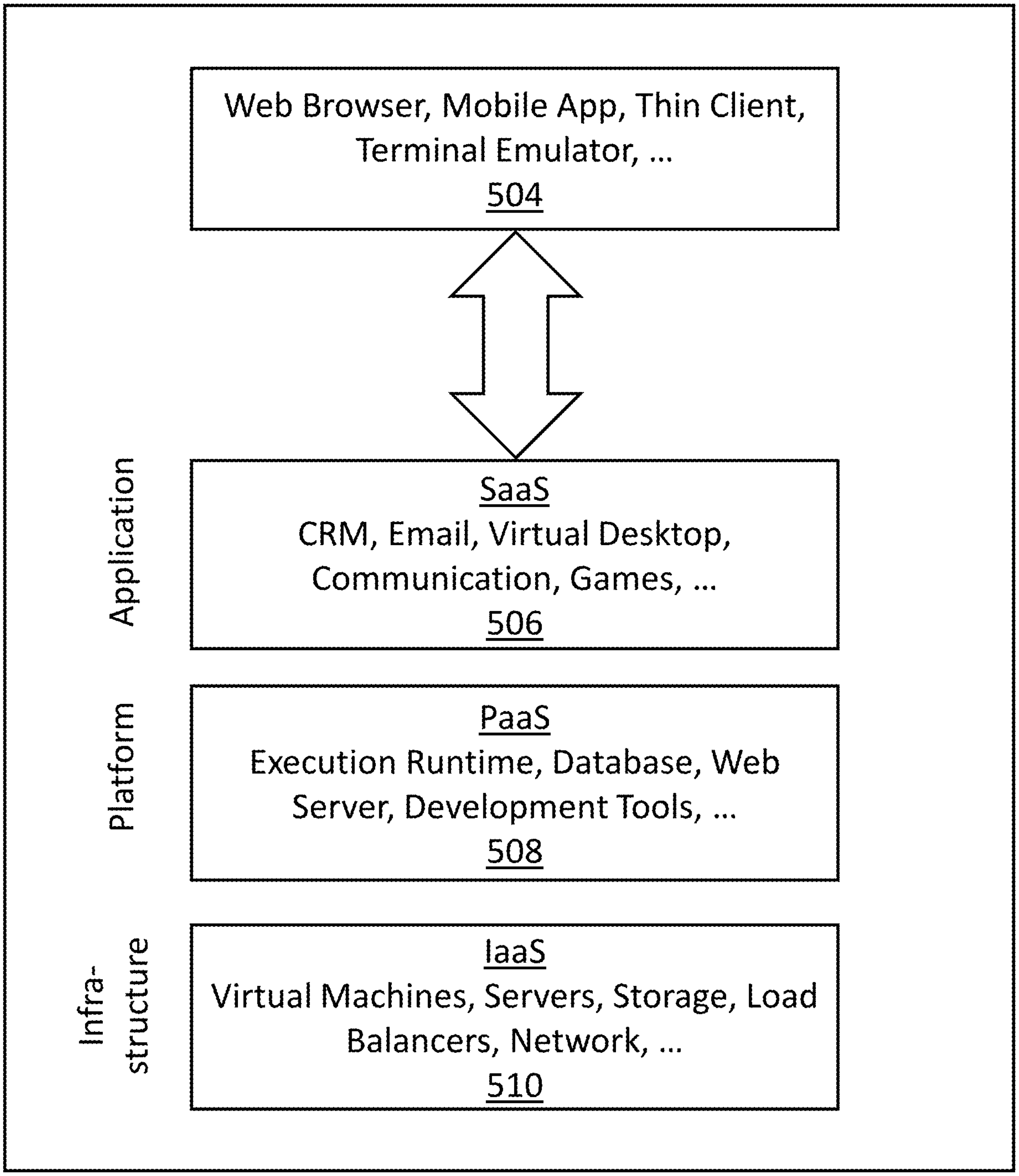
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1A, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, structured query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Survey engine 200, as discussed above and further below in more detail, can include components for the disclosed functionality. According to some embodiments, survey engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, survey engine 200 may be configured to implement and/or control a plurality of services and/or microservices, where each of the plurality of services/microservices are configured to execute a plurality of workflows associated with performing the disclosed network management. Non-limiting embodiments of such workflows are discussed and provided below.

According to some embodiments, as discussed above, survey engine 200 may function as an application provided by cloud system 106. In some embodiments, engine 200 may function as an application installed on a server(s), network location and/or other type of network resource associated with system 106. In some embodiments, engine 200 may function as an application installed and/or executing on AP device 112 and/or UE 102 (and/or sensors 110). In some embodiments, such application may be a web-based application accessed by AP device 112 and/or UE 102, and/or devices associated with sensors 110 over network 104 from cloud system 106. In some embodiments, engine 200 may be configured and/or installed as an augmenting script, program or application (e.g., a plug-in or extension) to another application or program provided by cloud system 106 and/or executing on AP device 112, UE 102 and/or sensors 110.

Figure 1B:
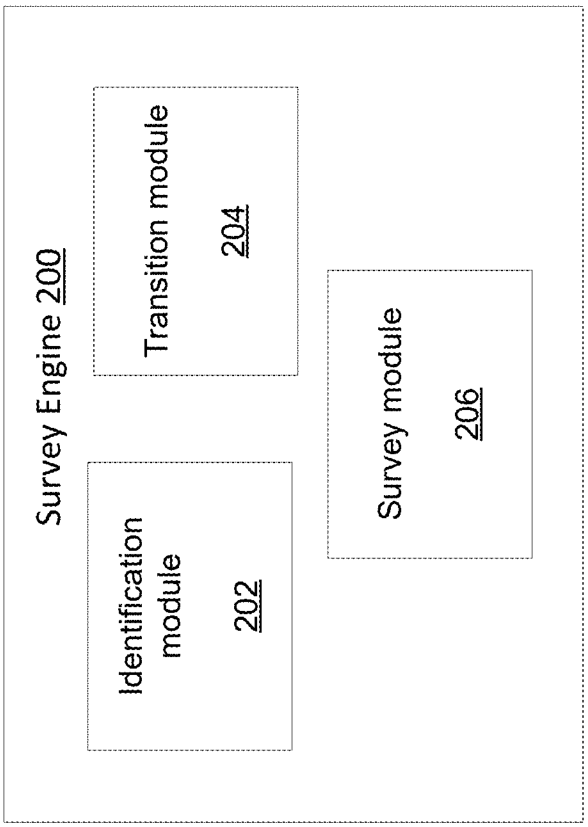
FIG. 1B is a block diagram illustrating components of an exemplary system according to some embodiments of the present disclosure.

As illustrated in FIG. 1B, according to some embodiments, survey engine 200 includes identification module 202, transition module 204 and survey module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 2A:
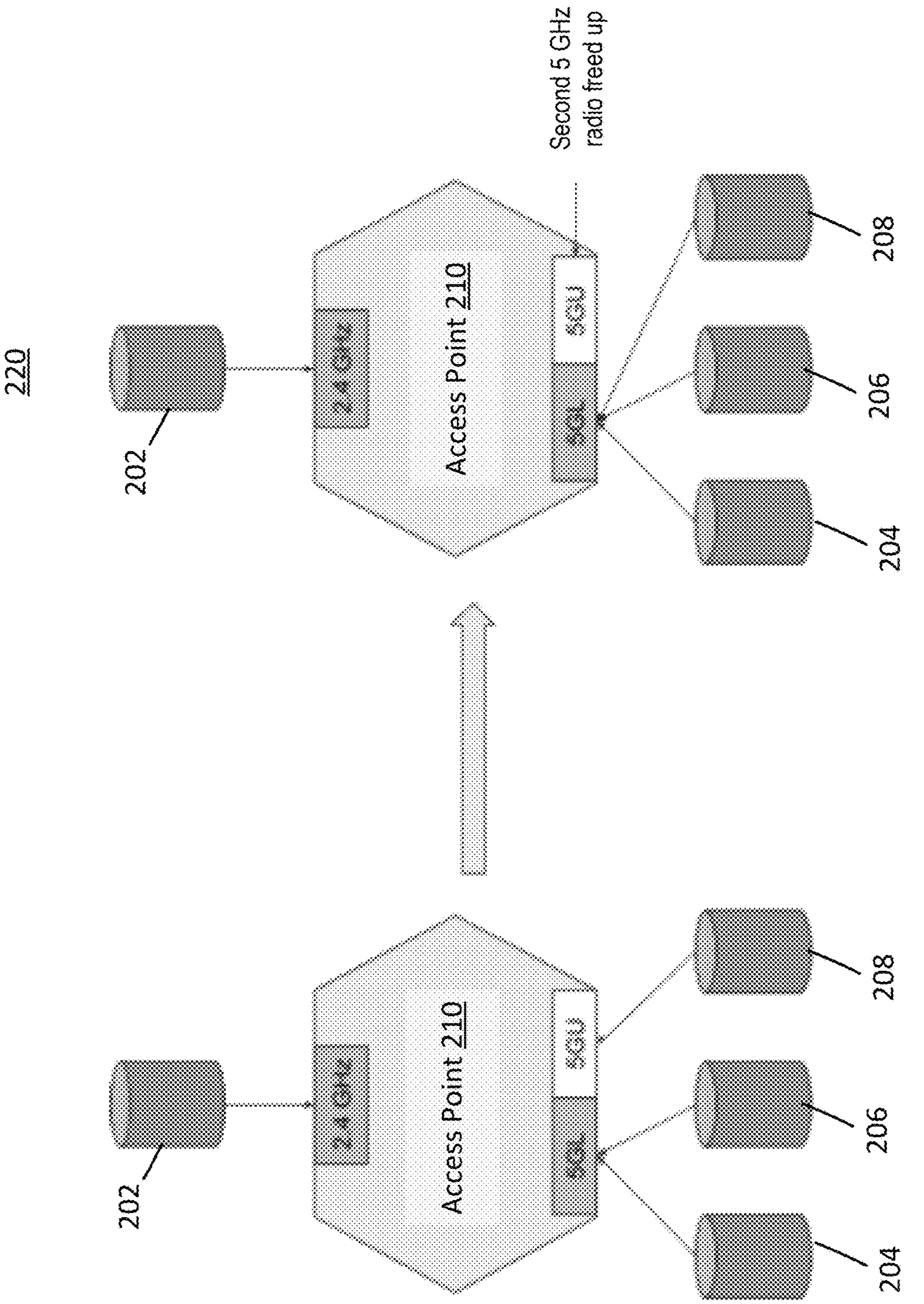
FIGS. 2A and 2B depict non-limiting example embodiments according to some embodiments of the present disclosure.

Turning to FIG. 2A, depicted are examples 200 and 220, which involve client devices 202-208 and AP 210. According to some embodiments, AP 210 can generally have a number of Wi-Fi radios (e.g., 3 radios, for example—2.4 GHz, Lower 5 GHz (5 GL) and Upper 5 GHz (5 GU). It should be understood that the reference to such radios is not to be construed as limiting, as other known or to be known radios can be implemented without departing from the scope of the instant disclosure (for example, a 6 GHz radio). According to some embodiments, such radios together can service both the fronthaul user network and backhaul mesh network.

According to some embodiments, by way of non-limiting example, as depicted in FIG. 2A and discussed in more detail with reference to Process 300 of FIG. 3, discussed infra, to perform opportunistic off-channel surveys, one of the two 5 GHz radios of AP 210 can be freed up such that both the fronthaul and the backhaul networks can be serviced by the other, in-use 5 GHz radio. According to some embodiments, engine 200, for example, operating as a controller provided by cloud system 106 can free up the second 5 GHz radio by moving both the fronthaul and backhaul networks to the first 5 GHz radio and then use steering mechanisms to steer the connected clients 204-208 to the first 5 GHz radio (as depicted via the connections of devices 204-208 in example 200, then in example 220). According to some embodiments, once freed up, the second 5 GHz radio can now be available to move to an off-channel for which the off-channel can be surveyed.

According to some embodiments, since one of the 5 GHz radios is always present on-channel, the disclosed functionality and network configuration does not experience performance degradation for the connected WiFi clients (e.g., devices 204-208, for example).

Moreover, in some embodiments, the disclosed systems and methods can be configured for In-Service Monitoring for each radio of AP 210 that operates a DFS channel. According to some embodiments, such In-Service-Monitoring for a DFS channel can be performed on a per channel basis (that is, per radio or for each radio). For example, when a 5 GU radio is moved to off-channel for a spectrum survey, the 5 GU radio no longer operates as an AP in the 5 GU spectrum and is therefore no longer needed to do In-Service Monitoring for radars. In some embodiments, while the 5 GL radio is operating on a DFS channel, the 5 GL radio can perform In Service Monitoring on its channel.

Accordingly, as discussed below, after the off-channel survey is complete, the controller can restore the previous topology by moving the fronthaul and backhaul network connections, accordingly, then steering back the clients to their original radios. Thus, for example, after steering is performed via the configuration in example 220, the topology/steering reverts back to that depicted in example 200.

Figure 2B:
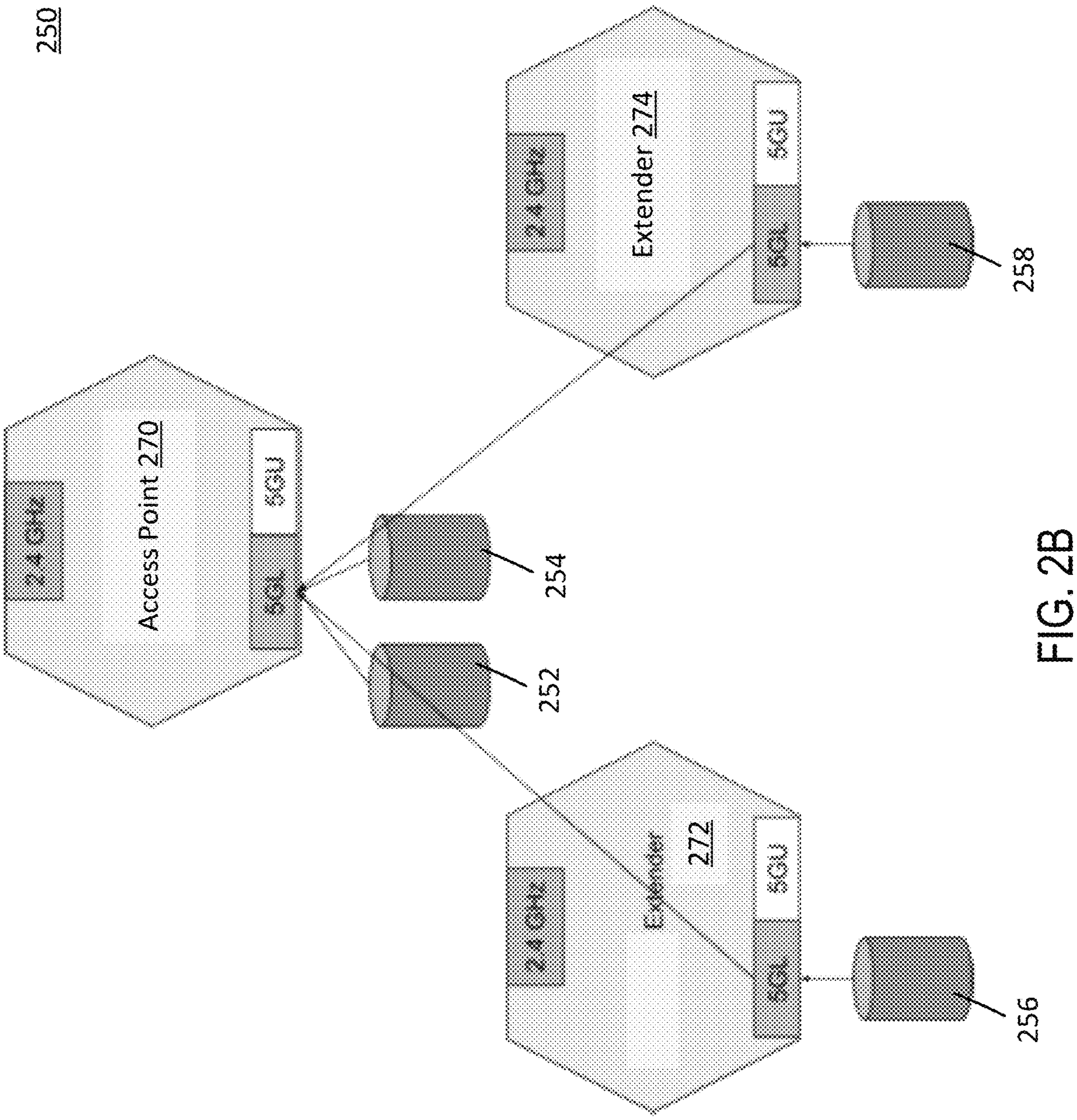

Turning to FIG. 2B, depicted is example 250, which is a network topology that includes AP 270 and extenders 272 and 274, and respectively connected client devices 252, 254, 256 and 258. Accordingly, in some embodiments, in a location with more than one APs (e.g., APs 270-274 as in FIG. 2B), engine 200 can coordinate and free up the additional radios on the other APs, at the same time or one after another, depending on the connected clients and their traffic. For example, as depicted in FIG. 2B, steering can be effectuated across APs at a location, so that surveying can be performed without an AP or client device experiencing a degradation in network coverage. Thus, once freed up, the APs can perform off-channel surveys accordingly.

Figure 3:
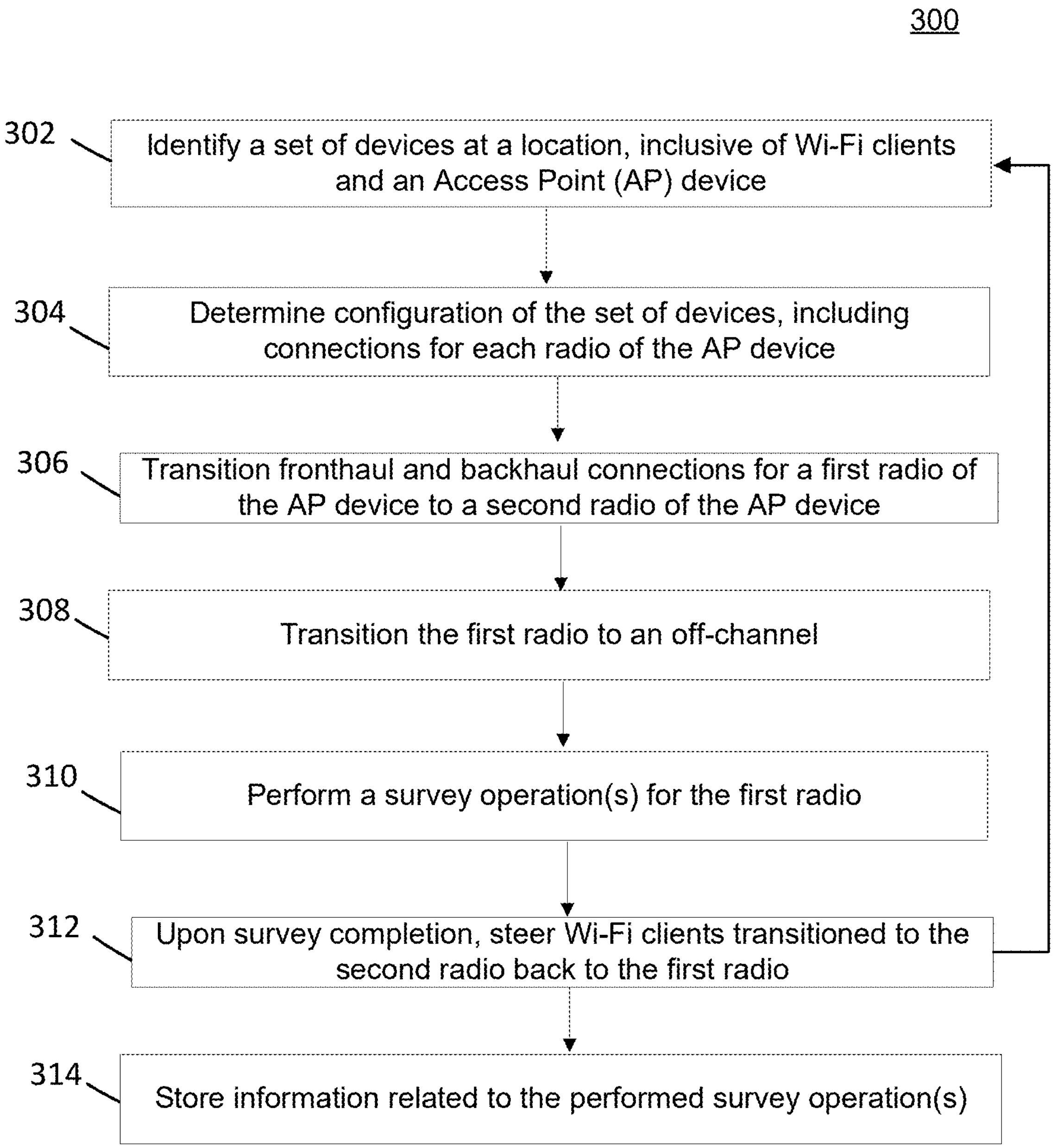
FIG. 3 illustrates an exemplary workflow according to some embodiments of the present disclosure.

Turning to FIG. 3, Process 300 provides non-limiting example embodiments for the disclosed network management framework. According to some embodiments, Steps 302 and 304 of Process 300 can be performed by identification module 202 of survey engine 200; Steps 306, 308 and 312 can be performed by transition module 204; and Steps 310 and 314 can be performed by survey module 206.

According to some embodiments, Process 300 begins with Step 302 where engine 200 can identify a set of devices for which they are connected to and/or providing a WiFi network at a location. According to some embodiments, the set of devices can include, but is not limited to, client devices, APs, and the like. For example, as per FIG. 2A discussed supra, client devices 204-208 and AP 210 can be identified.

It should be understood that while the discussion here can involve additional and/or a variety of different types of devices, as discussed above in relation to at least FIGS. 1A and 2B, inter alia, use the example in FIG. 2A should not be construed as limiting, as other types and/or quantities of devices can be utilized without departing from the scope of the instant application.

According to some embodiments, a location can correspond to, but is not limited to, a home, office, building, multi-dwelling unit (e.g., apartment complexes, for example) and/or any other type of physical location that can be configured to host and/or provide network connectivity to devices in/around a geographic and/or physical area (e.g., an office in an office building, for example).

In Step 304, engine 200 can determine a configuration or topology of the set of devices for which WiFi connectivity is being provided. In some embodiments, such determination can involve analyzing network characteristics, attributes and/or features of each nodes' sent/received signals respective to other nodes and/or the AP device, upon which the connections associated therewith can be determined therefrom. In some embodiments, such determination can be effectuated via engine 200 analyzing the network data for the set of devices via any type of known or to be known artificial intelligence/machine learning algorithm (e.g., a neural network, for example, a graph neural network (GNN) that can map the topology of a network).

By way of a non-limiting example, the network topology of example 200 in FIG. 2A can include information indicating, but not limited to, devices 204 and 206 being connected to the 5 GL radio of AP 210, and device 208 being connected to the 5 GU radio. In some embodiments, the information can further include information related to, but not limited to, device type, device identifier, network statistics, and the like.

In Step 306, engine 200 can transition fronthaul and backhaul connections for a first radio of the AP device to a second ratio of the AP device. Such transitioning can be based on engine 200 determining that a survey is to be performed, which can be based on, but not limited to, a request, regulatory compliance criteria, and/or time period expiring, and the like.

For example, as depicted in FIG. 2A, device 208, as in example 200, was connected to the 5 GU radio, then, as per Step 306, is transitioned to the 5 GL radio, as in example 220, thereby freeing up the 5 GU radio for survey operations.

In Step 308, engine 200 can transition the first radio to an off-channel. As discussed herein, an off-channel for a radio of an AP refers to a frequency channel that is not actively being used for transmitting or receiving data packets by that specific radio interface. APs, as discussed above, serve as central hubs for connecting wireless devices to a network, and typically operate on specific channels within the radio frequency spectrum. These channels can be divided to minimize interference and optimize signal quality. However, in some scenarios, APs may have the capability to monitor or scan other channels in addition to the one they are actively using. This allows APs (and engine 200) to gather information about neighboring networks, assess signal strength, and potentially identify less congested channels for improved performance. Therefore, an off-channel for a radio of an AP is essentially any channel that it is not currently utilizing for primary communication purposes but may monitor for management or optimization tasks.

In Step 310, engine 200 can perform a survey operation(s) for the first radio (that was transitioned in Step 308). For example, the 5 GU radio in example 220 of FIG. 2A.

According to some embodiments, survey operations (or surveys, used interchangeably) of radios on off-channels involve the process of scanning for wireless signals on frequencies that are not actively used for communication by the scanning device itself. This technique can be employed in wireless networking environments, particularly by APs, to gather information about neighboring networks, signal strength, and potential sources of interference, among other data. Tus, when a radio conducts an off-channel survey, the radio (e.g., first radio, for example) temporarily suspends its normal data transmission activities on its primary operating channel and listens across other channels within its operating frequency range. By doing so, the radio can detect and analyze signals from nearby access points or other wireless devices operating on different channels. As discussed herein, such information is valuable for network optimization, as it enables engine 200 to collect and determine information related to, but not limited to, channel allocation, power settings and other configurations that can mitigate interference and/or improve overall network performance. Thus, execution of off-channel survey operations can provide technical functionality for maintaining the reliability and efficiency of the WiFi network, thereby ensuring seamless connectivity for each connected device and optimal user experience.

In Step 312, engine 200 can execute functionality for steering the client devices transitioned to the second radio (from Step 306) back to the first radio, which can be performed upon the completion of the survey operations in Step 310. In some embodiments, such steering causes the first radio to be transitioned from the off-channel to its original channel frequency. Such transition can be performed in a similar manner as discussed above at least respective to Step 306 and FIGS. 2A and 2B.

For example, in Step 312, the configuration of the network in FIG. 2A reverts back to example 200 from example 220.

As depicted in FIG. 3, upon completing the survey and steering of devices back to their original configuration, engine 200 can revert back to Step 302, whereby upon a predetermined time period, as discussed above, can perform the steps of Process 300 for another radio of the AP and/or the same radio.

And, in Step 314, engine 200 can store the information related to the preceding steps, which can correspond to, but not be limited to, the information determined upon performance of the survey operation(s).

Thus, as discussed above, surveys can be pivotal in the optimization of WiFi networks, offering vital insights into the wireless environment. Firstly, they aid in channel selection by identifying less congested channels nearby, enabling administrators to allocate channels strategically to minimize interference and maximize throughput. Secondly, these surveys help detect sources of interference, such as neighboring WiFi networks or electronic devices, allowing administrators to take appropriate measures to mitigate interference effectively. Moreover, the disclosed surveys can provide valuable information on signal strength and coverage areas, enabling administrators to optimize coverage by adjusting access point placement or antenna configurations. Additionally, they contribute to roaming optimization by analyzing signal strength between adjacent access points, ensuring seamless handoffs for WiFi clients. Indeed, such surveys can facilitate continuous performance monitoring, allowing administrators, engine 200 and/or AP, for example, to proactively identify and address issues before they affect users, ultimately leading to a more robust and reliable WiFi network. For example, improve network connectivity (e.g., throughput, bandwidth, reduce latency, and the like) for the connected devices.

Figure 6:
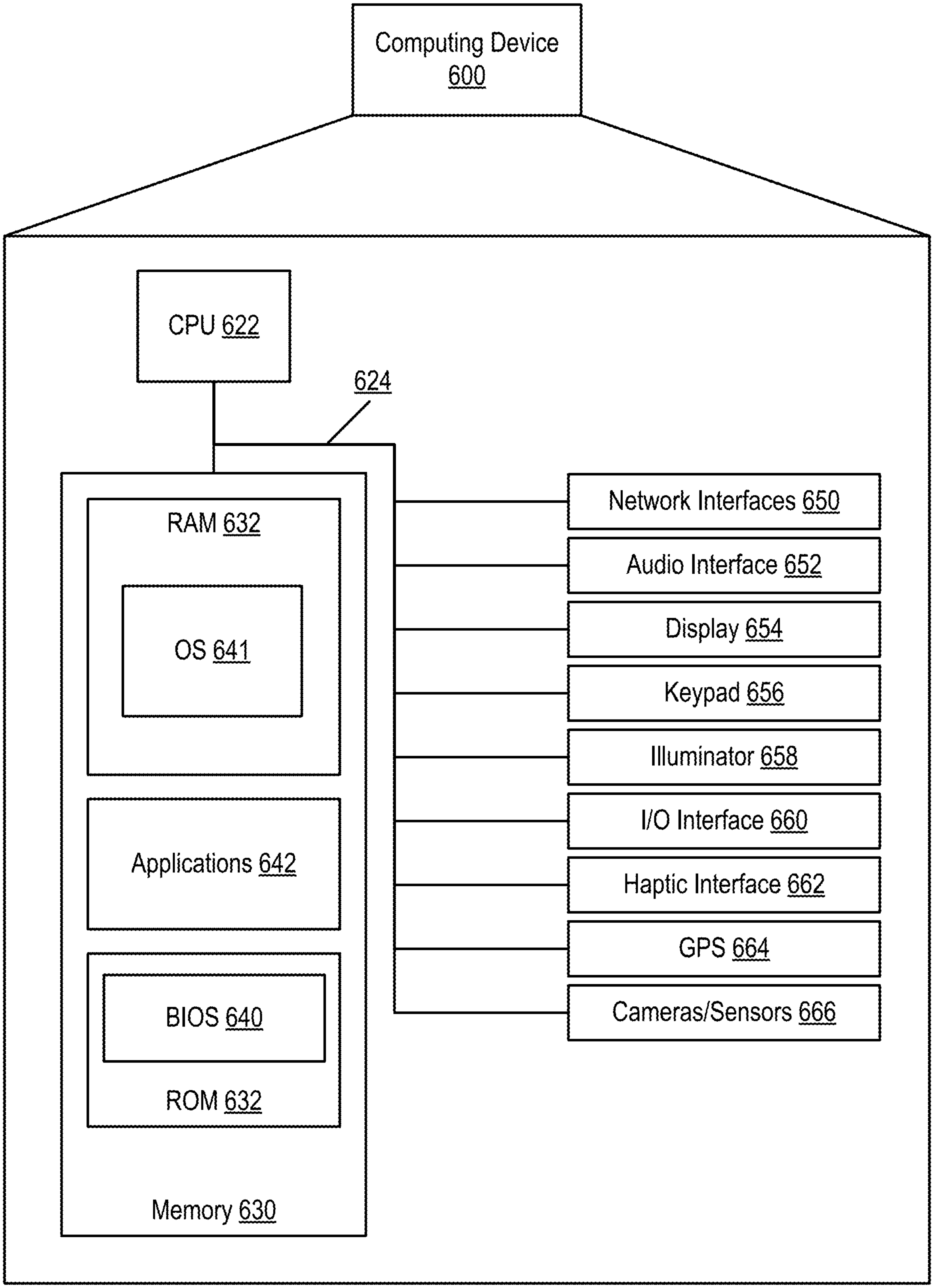
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1A.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising:

identifying, for a location, a set of devices associated with a wireless fidelity (WiFi) network, the set of devices comprising a device and an access point (AP), the AP comprising at least a first and second radio;

transitioning a connection of the device to the AP from the first radio to the second radio;

transitioning, upon the connection transition, the first radio to an off-channel associated with the WiFi network, the off-channel comprising a frequency channel that is not actively being used for transmitting or receiving data packets by the AP;

performing, upon the first radio transition, a survey operation via the first radio, the survey operation comprising a determination of data related a frequency band supported by the first radio; and steering, upon completion of the survey operation, the device from the second radio back to the first radio.

Aspect 2. The method of aspect 1, further comprising:

configuring the WiFi network based on the data determined from the survey operation, the configuration causing modifications to the WiFi network that improves network connectivity for the device.

Aspect 3. The method of aspect 1, further comprising:

determining a network topology of the WiFi network, the topology comprising an indication of a configuration of connections between the set of devices, wherein the network topology is used to perform the transitioning of the connections and the transitioning of the first radio.

Aspect 4. The method of aspect 1, wherein the steering further comprises transitioning the first radio from the off-channel to an original channel frequency.

Aspect 5. The method of aspect 1, further comprising:

storing the data determined from the survey operation.

Aspect 6. The method of aspect 1, wherein the steps are subsequently performed for the second radio.

Aspect 7. The method of aspect 1, wherein the connections of the device comprise fronthaul and backhaul connections.

Aspect 8. The method of aspect 1, wherein:

the AP comprises a plurality of radios, wherein the steps are performed based on the plurality of radios, and the set of devices comprises a plurality of devices, wherein the steps are performed based on the plurality of devices.

Aspect 9. The method of aspect 1, wherein the set of devices comprises a plurality of APs, wherein the steps are performed based on the plurality of APs.

Aspect 10. The method of aspect 1, wherein the first and second radio are associated with at least one of a 2.4 GHz radio, Lower 5 GHz (5 GL) radio, Upper 5 GHz (5 GU) radio and 6 Hz radio.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:

identifying, for a location, a set of devices associated with a wireless fidelity (WiFi) network, the set of devices comprising a device and an access point (AP), the AP comprising at least a first and second radio;

transitioning a connection of the device to the AP from the first radio to the second radio;

transitioning, upon the connection transition, the first radio to an off-channel associated with the WiFi network, the off-channel comprising a frequency channel that is not actively being used for transmitting or receiving data packets by the AP;

performing, upon the first radio transition, a survey operation via the first radio, the survey operation comprising a determination of data related a frequency band supported by the first radio; and steering, upon completion of the survey operation, the device from the second radio back to the first radio.

2. The method of claim 1, further comprising:

configuring the WiFi network based on the data determined from the survey operation, the configuration causing modifications to the WiFi network that improves network connectivity for the device.

3. The method of claim 1, further comprising:

determining a network topology of the WiFi network, the topology comprising an indication of a configuration of connections between the set of devices, wherein the network topology is used to perform the transitioning of the connections and the transitioning of the first radio.

4. The method of claim 1, wherein the steering further comprises transitioning the first radio from the off-channel to an original channel frequency.

5. The method of claim 1, further comprising:

storing the data determined from the survey operation.

6. The method of claim 1, wherein the steps are subsequently performed for the second radio.

7. The method of claim 1, wherein the connections of the device comprise fronthaul and backhaul connections.

8. The method of claim 1, wherein:

the AP comprises a plurality of radios, wherein the steps are performed based on the plurality of radios, and the set of devices comprises a plurality of devices, wherein the steps are performed based on the plurality of devices.

9. The method of claim 1, wherein the set of devices comprises a plurality of APs, wherein the steps are performed based on the plurality of APs.

10. The method of claim 1, wherein the first and second radio are associated with at least one of a 2.4 GHz radio, Lower 5 GHz (5 GL) radio Upper 5 GHz (5 GU) radio and a 6 GHz radio.

11. A system comprising:

a processor configured to:

identify, for a location, a set of devices associated with a wireless fidelity (WiFi) network, the set of devices comprising a device and an access point (AP), the AP comprising at least a first and second radio;

transition a connection of the device to the AP from the first radio to the second radio;

transition, upon the connection transition, the first radio to an off-channel associated with the WiFi network, the off-channel comprising a frequency channel that is not actively being used for transmitting or receiving data packets by the AP;

perform, upon the first radio transition, a survey operation via the first radio, the survey operation comprising a determination of data related a frequency band supported by the first radio; and steer, upon completion of the survey operation, the device from the second radio back to the first radio.

12. The system of claim 11, wherein the processor is further configured to:

configure the WiFi network based on the data determined from the survey operation, the configuration causing modifications to the WiFi network that improves network connectivity for the device.

13. The system of claim 11, wherein the processor is further configured to:

determine a network topology of the WiFi network, the topology comprising an indication of a configuration of connections between the set of devices, wherein the network topology is used to perform the transitioning of the connections and the transitioning of the first radio.

14. The system of claim 11, wherein the steering further comprises transitioning the first radio from the off-channel to an original channel frequency.

15. The system of claim 11, wherein at least one of the AP comprising a plurality of radios, the set of devices comprising a plurality of devices, and the set of devices comprising a plurality of APs.

16. A non-transitory computer-readable storage medium tangibly encoded with computer-executable instructions that when executed by a processor, perform a method comprising steps of:

identifying, for a location, a set of devices associated with a wireless fidelity (WiFi) network, the set of devices comprising a device and an access point (AP), the AP comprising at least a first and second radio;

transitioning a connection of the device to the AP from the first radio to the second radio;

transitioning, upon the connection transition, the first radio to an off-channel associated with the WiFi network, the off-channel comprising a frequency channel that is not actively being used for transmitting or receiving data packets by the AP;

performing, upon the first radio transition, a survey operation via the first radio, the survey operation comprising a determination of data related a frequency band supported by the first radio; and steering, upon completion of the survey operation, the device from the second radio back to the first radio.

17. The non-transitory computer-readable storage medium of claim 16, further comprising:

configuring the WiFi network based on the data determined from the survey operation, the configuration causing modifications to the WiFi network that improves network connectivity for the device.

18. The non-transitory computer-readable storage medium of claim 16, further comprising:

determining a network topology of the WiFi network, the topology comprising an indication of a configuration of connections between the set of devices, wherein the network topology is used to perform the transitioning of the connections and the transitioning of the first radio.

19. The non-transitory computer-readable storage medium of claim 16, wherein the steering further comprises transitioning the first radio from the off-channel to an original channel frequency.

20. The non-transitory computer-readable storage medium of claim 16, wherein:

the AP comprises a plurality of radios, wherein the steps are performed based on the plurality of radios, the set of devices comprises a plurality of devices, wherein the steps are performed based on the plurality of devices, and the set of devices comprises a plurality of APs, wherein the steps are performed based on the plurality of APs.

* * * * *